United States Patent [19]

Hagiwara

[11] Patent Number: 5,111,339
[45] Date of Patent: May 5, 1992

[54] LENS ACTUATOR

[75] Inventor: Hiroyuki Hagiwara, Tokyo, Japan

[73] Assignee: Canon Kabushiki Kaisha, Tokyo, Japan

[21] Appl. No.: 514,414

[22] Filed: Apr. 25, 1990

[30] Foreign Application Priority Data

Apr. 28, 1989 [JP] Japan .................................. 1-107765
May 16, 1989 [JP] Japan ................................... 1-120271

[51] Int. Cl.⁵ ................................................ G02B 7/02
[52] U.S. Cl. ..................................... 359/813; 359/823; 369/44.11; 369/44.22
[58] Field of Search ............... 350/247, 245, 255, 252; 369/44.11, 44.18, 44.22

[56] References Cited

U.S. PATENT DOCUMENTS

| | | | |
|---|---|---|---|
| 4,473,274 | 9/1984 | Yano et al. | 359/823 |
| 4,571,026 | 2/1986 | Maruta | 359/813 |
| 4,679,903 | 7/1987 | Kasahara et al. | 359/813 |
| 4,752,117 | 6/1988 | Ichikawa et al. | 359/813 |

FOREIGN PATENT DOCUMENTS 62-54837 3/1987 Japan .
62-90420 6/1987 Japan .

Primary Examiner—Loha Ben

[57] ABSTRACT

A lens actuator capable of driving a lens smoothly in two-directions and which is small in size and light in weight is disclosed. The lens actuator include a base having a supporting shaft, a lens holder set so as to be rotatable about and slidable along the supporting shaft, a lens retained by the holder so that an optical axis thereof is parallel with the supporting shaft and the lens is mounted on the holder at a position separate from the supporting shaft, a first coil mounted on the holder for generating a force for rotating the holder by flowing a current therein, a second coil mounted on the holder for generating a force for slidably moving the holder along the supporting shaft by flowing a current therein and a magnet mounted on the base for applying a magnet field to the first and second coils. The first coil is mounted on the holder on the side opposed to the lens with the supporting shaft between. The first coil balances the weight of the lens so that the center of gravity of the holder is substantially at the center of rotation thereof.

7 Claims, 5 Drawing Sheets

LENS ACTUATOR

BACKGROUND OF THE INVENTION

1. Field of the Invention

The present invention relates to a lens actuator for use in a recording/reproduction pick-up of various types of optical information recording/reproduction apparatuses, such as an optical video disk player, a compact digital audio disk player, and an optical data memory device.

2. Related Background Art

In the above-described optical information recording/reproduction apparatuses, recording and/or reproduction of information is normally conducted by converting a light beam emitted from a light source such as a semiconductor laser onto an optical recording medium by means of an objective lens. Furthermore, focusing control and tracking control are performed to accurately focus the light beam on a track of the recording medium by moving the objective lens in a direction of an optical axis thereof and a direction perpendicular to that direction. Such movements of the objective lens are conducted by means of a lens actuator.

FIGS. 1A and 1B are respectively schematic plan and side elevational views of a conventional lens actuator. In this lens actuator, an objective lens 101 is retained on a substantially cylindrical bobbin 102, which is rotatably and slidably supported by a supporting shaft 103. On the peripheral side surface of the bobbin 102 are provided a focusing coil 105 and a tracking coil 104 to which a magnetic field is applied by means of a yoke consisting of a magnet and a ferromagnetic member which are not shown. Conduction of currents in these coils generate a force which rotates the bobbin 102 and a force which slides the bobbin 102 along the supporting shaft 103. A reference numeral 106 denotes a prism mirror for bending a bundle of light, and a reference numeral 107 denotes a counter weight for the objective lens 101.

Such a lens actuator has been disclosed by, for example, U.S. Pat. Nos. 4,473,274 and 4,571,026. Japanese Patent Laid-Open No. 62-54837 discloses a lens actuator which has the same configuration as that of the above-described lens actuator and in which the tracking coil is mounted on the bobbin on the side opposed to the objective lens with respect the supporting shaft.

FIGS. 2A and 2B are respectively schematic plan and side elevational views of another example of the conventional lens actuator. In this lens actuator, an objective lens 111 is retained on an elliptical bobbin 108 made of a resin, which is rotatably and slidably supported by a supporting shaft 113 that passes the center of the bobbin 108. A tracking coil 109 is provided on the side surface of the bobbin 108, and a focusing coil 110 is provided on the lower portion of the bobbin 108. A magnetic field is applied to these coils 109 and 110 by means of a magnet (not shown). Conduction of currents in the coils 109 and 110 causes rotation and sliding of the bobbin 108. A counter weight 117 is mounted on the bobbin 108 on the side opposed to the objective lens 111 with respect to the supporting shaft 113. A reference numeral 116 denotes a prism mirror.

The aforementioned conventional lens actuators include the counter weight which is not associated with the driving of a lens. Provision of the counter weight prevents reduction in the weight and size of the lens actuator. However, if no counter weight is provided on the bobbin, a force which slants the bobbin will be exerted due to the weight of the objective lens, thereby generating a resistance between the bobbin and the supporting shaft and thus causing such a problem that the bobbin can not be smoothly slid.

SUMMARY OF THE INVENTION

In view of the aforementioned problem of the conventional technique, an object of the present invention is to provide a lens actuator which is small in size and light in weight and which is capable of driving a lens smoothly in two-dimensional directions.

To this end, the present invention provides a lens actuator which comprises: a base having a supporting shaft; a lens holder set so as to be rotatable about and slidable along the supporting shaft; a lens retained by the holder in such a manner that an optical axis thereof is parallel to the supporting shaft, the lens being mounted on the holder at a position separate from the supporting shaft; a first coil mounted on the holder on the side opposed to the lens with the supporting shaft between, the first coil being adapted to generate a force for rotating the holder by the flow of a current in the first coil, the first coil balancing the weight of the lens such that the center of gravity of the holder is substantially at the center of the rotation thereof; a second coil mounted on the holder, the second coil being adapted to generate a force for sliding the holder along the supporting shaft by the flow of a current in the second coil; and a magnet mounted on the base for applying a magnetic field to the first and second coils.

DESCRIPTION OF THE PREFERRED EMBODIMENTS

Figure 1A:
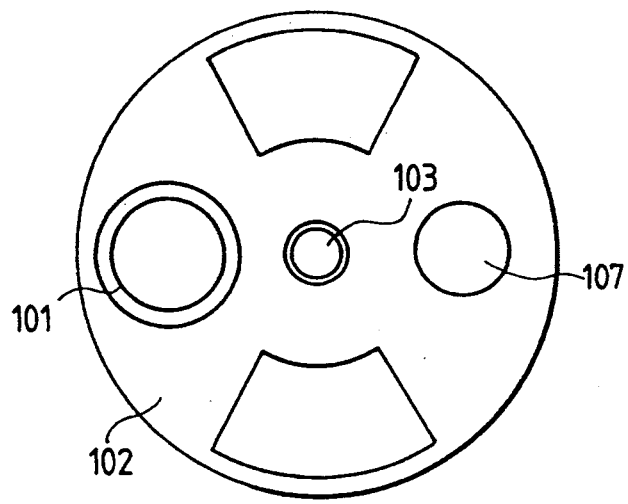
FIGS. 1A and 1B are respectively schematic plan and side elevational views of an example of a conventional lens actuator.
Figure 1B:
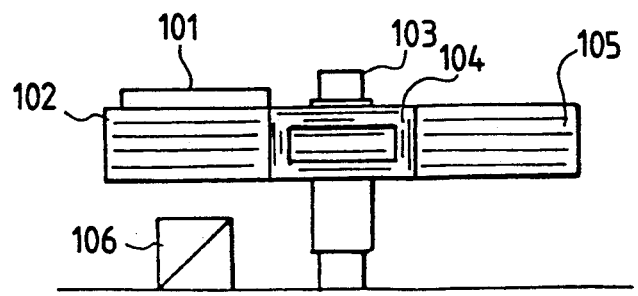
Figure 2A:
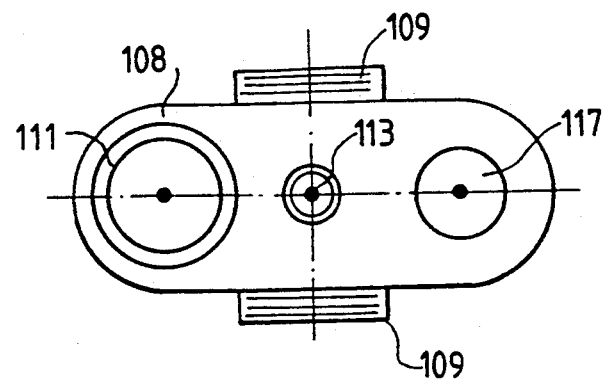
FIGS. 2A and 2B are respectively schematic plan and side elevational views of another example of the conventional lens actuator.
Figure 2B:
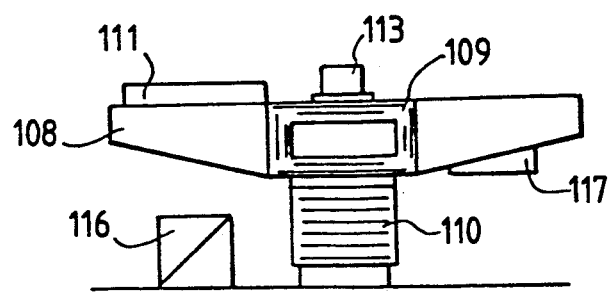
Figure 3A:
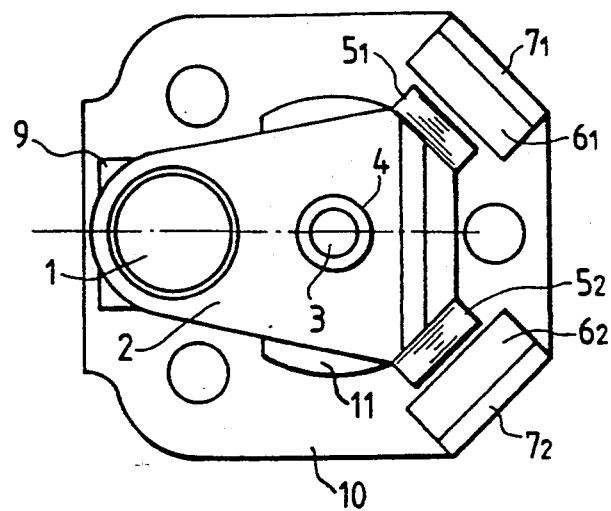
FIGS. 3A and 3B are respectively schematic plan and side elevational views of a first embodiment of a lens actuator according to the present invention.
Figure 3B:
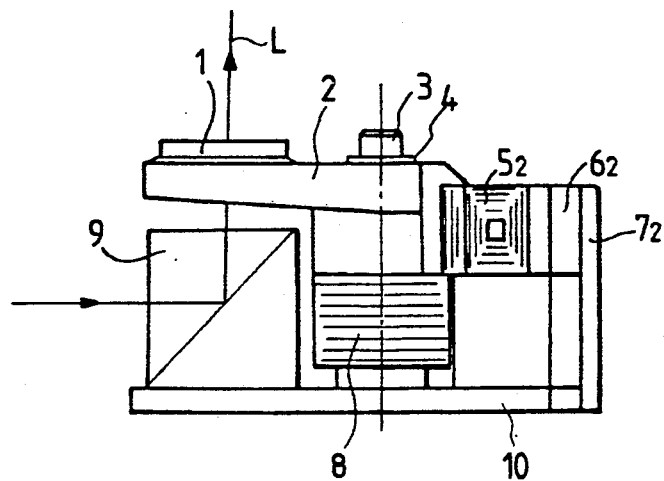

FIGS. 3A and 3B are schematic plan and side elevational views of a first embodiment of a lens actuator according to the present invention.

In the lens actuator, an objective lens 1 made of a non-magnetic material (resin, aluminum or the like) is retained on a bobbin 2. A base 10 has a supporting shaft 3 whose surface is coated with a material having a low $\mu$ (mu) value to a predetermined thickness in order to achieve reduction in frictional resistance. The bobbin 2 is fitted onto the supporting shaft 3 with a bearing 4 therebetween. The bobbin 2 is rotatable about and slidable along the supporting shaft 3. The bearing 4 is formed of aluminum or the like integrally with the bobbin 2. The bearing 4 has an inner peripheral surface on which the specular process is subjected.

Tracking coils $5_1$ and $5_2$ wound in a rectangular shape are mounted on the bobbin 2 on the side opposed to the objective lens 1 with the supporting shaft 3 therebetween. Magnets $6_1$ and $6_2$ are provided at positions so as to respectively face the coils $5_1$ and $5_2$ in order to apply a magnetic field thereto. The magnets $6_1$ and $6_2$ are mounted on supporting portions $7_1$ and $7_2$ provided on the base 10. Each of the magnets $6_1$ and $6_2$ is divided into two portions, which are magnetized in opposite directions, by a line which lies parallel to the supporting shaft 3.

When a current is caused to flow in the tracking coils $5_1$ and $5_2$, an electromagnetic force is induced between the magnetic field applied by the magnets $6_1$ and $6_2$ and the current flowing in the tracking coils $5_1$ and $5_2$, and thus generating a driving force which rotates the bobbin 2 about the supporting shaft 3. Also, the coils $5_1$ and $5_2$ serve as a balancer relative to the objective lens 1. The center of gravity of the bobbin 2 with the coils and the objective lens mounted thereon is substantially on the center of the bobbin 2, i.e., on the central axis of the supporting shaft 3. Hence, the bobbin 2 is always held horizontally, and can be moved smoothly along the supporting shaft 3 without causing any trouble.

A focusing coil 8 is coaxially wound around the supporting shaft 3 at a position lower than the bobbin 2. A magnetic field is applied to this focusing coil 8 by a magnet 11 fixed to the base 10 in a direction in which it crosses the winding of the coil 8. Thus, when a current is caused to flow in the coil 8, an electromagnetic force is generated parallel to the supporting shaft 3, thereby enabling the bobbin 2 to be caused to slide along the supporting shaft 3.

The lens actuator arranged in the manner described above is incorporated in an optical pick-up of an optical recording/reproduction apparatus. A light beam L emitted from a light source (not shown) is deflected by means of the prism mirror 9, and the deflected light beam is then condensed onto the recording medium such as an optical disk by means of the objective lens 1. Currents are respectively caused to flow in the focusing coil 8 and the tracking coils $5_1$ and $5_2$ on the basis of a focusing error signal and a tracking error signal which are detected from light reflected by the recording medium. Focusing control and tracking control are performed by moving the lens 1 in a direction of the optical axis thereof and in a direction perpendicular to that direction due to the electromagnetic forces generated by these coils.

In this embodiment, the tracking coils $5_1$ and $5_2$ are mounted at positions corresponding to the two angles of an isosceles triangle whose vertical angle is at the objective lens so as to allow backlash generated by a clearance between the bearing of the bobbin and the supporting shaft to be restricted in the manner described below.

Figure 4:
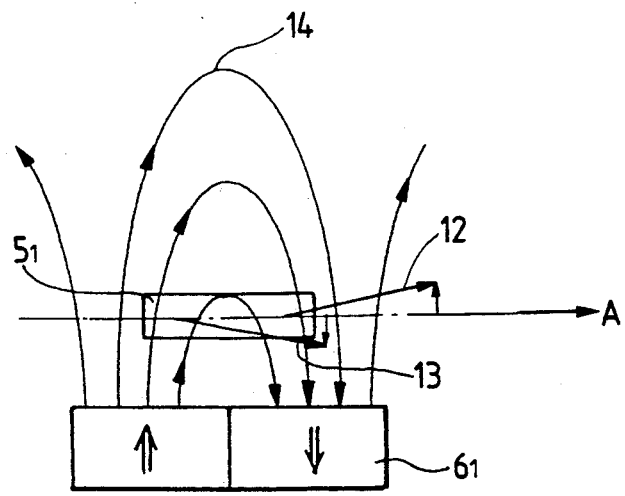
FIGS. 4 to 6 respectively illustrate a driving force generated in the present invention.
Figure 5:
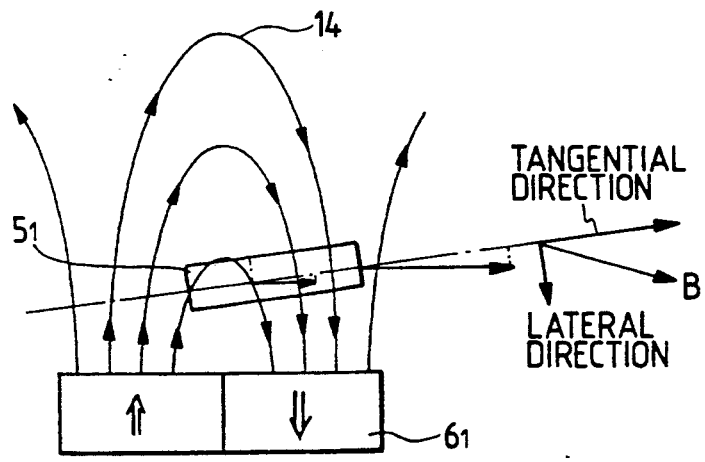

As shown in FIG. 4, magnetic lines of force 14 generated by the magnet $6_1$ have an arcuate form. When a current is caused to flow in the tracking coil $5_1$, electromagnetic forces are generated in directions indicated by the arrows 12 and 13 in the portion of the coil conductor which is parallel to the supporting shaft. In these forces, the lateral forces cancel each other, and only a tangential force indicated by the arrow A remains. When the tracking coil $5_1$ is moved in the manner shown in FIG. 5 and is no longer parallel to the magnet $6_1$, a driving force is generated in the coil $5_1$ in the direction indicated by the arrow B. This driving force can be considered as a combination of the force in the tangential direction and that in the lateral direction.

Figure 6:
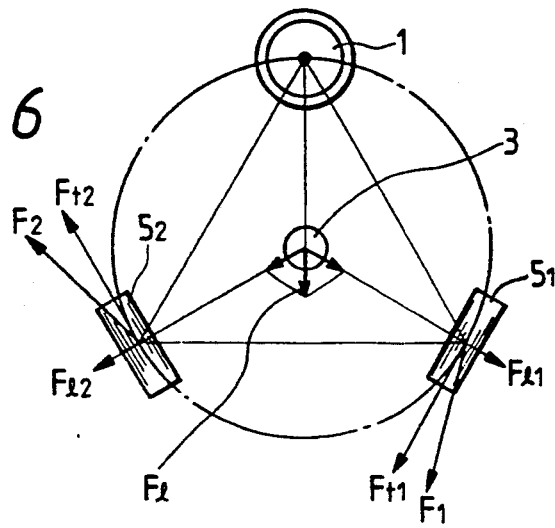

Similarly, the aforementioned driving force is generated between the coil $5_2$ and the magnet $6_2$. FIG. 6 is a graphic presentation of the forces applied to the bobbin. In FIG. 6, reference numerals 1 and 3 respectively denote the objective lens and the supporting shaft. Forces $F_1$ and $F_2$ are respectively generated in the tracking coils $5_1$ and $5_2$. Tangential components $F_{t1}$ and $F_{t2}$ of the forces $F_1$ and $F_2$ act on the bobbin to rotate it. Lateral components $F\lambda_1$ and $F\lambda_2$ of the forces $F_1$ and $F_2$ are combined into a force $F\lambda$. The force $F\lambda$ acts on the bobbin and presses the bobbin against the supporting shaft, and thereby decreasing backlash caused by the clearance between the supporting shaft and the bearing and preventing slanting of the optical axis. Of the force generated by tracking coils, the force $F\lambda$ is a component having a very small magnitude, so it does not deform the supporting shaft 3.

Thus, when the two tracking coils are disposed such that the angle between the lines connecting these coils to the center of the supporting shaft is other than 180°, the bobbin can be pressed against the supporting shaft, and the adverse effects of the clearance therebetween can thereby be eliminated.

Figure 7A:
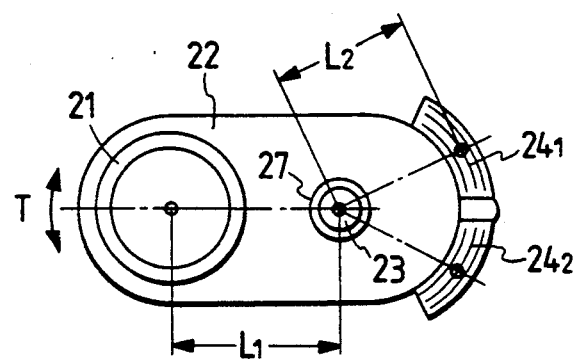
FIGS. 7A and 7B are respectively schematic plan and side elevational views of a second embodiment of the lens actuator according to the present invention.
Figure 7B:
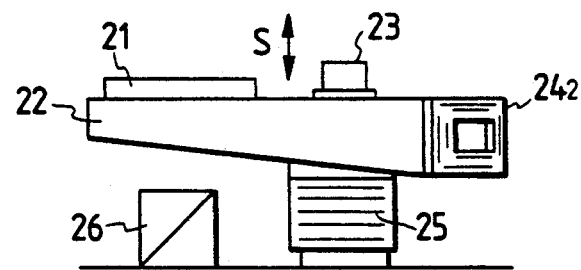

FIGS. 7A and 7B are respectively schematic plan and side elevational views of another example of the lens actuator according to the present invention.

In the lens actuator shown in FIGS. 7A and 7B, an objective lens 21 is retained on an elliptical bobbin 22, which is fitted onto the supporting shaft 23 with a bearing 27 therebetween. The bobbin 22 is supported by the supporting shaft 23 in such a manner as to be rotatable about and slidable along the supporting shaft 23.

Tracking coils $24_1$ and $24_2$ are mounted on the bobbin 22 on the side opposed to the objective lens 21 with the supporting shaft 23 between. A magnetic field is applied to the coils $24_1$ and $24_2$ by a magnet which is not shown. When a current is caused to flow in the coils $24_1$ and $24_2$, a driving force which rotates the bobbin 22 about the supporting shaft 23 is generated. A focusing coil 25 is provided below the bobbin 22. A magnetic field is also applied to the coil 25 by a magnet which is not shown. Conduction of current in the coil 25 generates a driving force which slides the bobbin 22 along the supporting shaft 23.

In this embodiment, a distance $L_1$ from the center of the supporting shaft to the center of the objective lens is made longer than a distance $L_2$ from the center of the supporting shaft to the center of gravity of each of the tracking coils. In this way, the objective lens can be moved a long distance in the tracking direction by moving the tracking coils a small distance.

Although no magnet is shown in FIGS. 7A and 7B, the magnets may be structured in the same manner as those shown in FIGS. 3A and 3B. A reference numeral 26 in FIG. 7B denotes a prism mirror.

Various modifications of the present invention are possible. For example, the present invention may be arranged such that the tracking coils and the focusing coil are positioned one on top of the other so as to apply a magnetic field to both the tracking coils and the focusing coil from a single magnet. It is to be noted that all changes that fall within the metes and bounds of the claims or equivalence of such metes and bounds are intended to be embraced by the claims.

What is claimed is:

1. A lens actuator comprising:
   a base having a supporting shaft;

a lens holder set so as to be rotatable about and slidable along said supporting shaft;

a lens retained by said lens holder in such a manner that an optical axis thereof is parallel to said supporting shaft, said lens being mounted on said lens holder at a position separate from said supporting shaft;

means for generating a force for rotating said holder in response to the flow of current therethrough, comprising first coil means mounted on said holder on the side opposite to said lens with said supporting shaft therebetween, the distance from the center of said supporting shaft to the center of said supporting shaft to the center of gravity of said first coil means;

means for generating a force for sliding said holder along said supporting shaft in response to the flow of a current therethrough, comprising second coil means mounted on said holder; and a magnet mounted on said base for applying a magnetic field to both generating means.

2. A lens actuator according to claim 1, wherein said first coil means comprises two coils which are respectively located at position corresponding to the two corners at the base of an isosceles triangle and wherein said lens is mounted at a third corner of the isosceles triangle.

3. A lens actuator according to claim 2, wherein each of said two coils of said first coil means has a rectangular form, and is mounted on a side surface of said holder.

4. A lens actuator according to claim 1, wherein said second coil means has a drum-like shape and is coaxial with respect to said supporting shaft.

5. A lens actuator according to claim 1, further comprising a mirror for directing a light beam to said lens by deflecting the light beam.

6. A lens actuator according to claim 1, wherein said holder is made of a non-magnetic material.

7. A lens actuator according to claim 1, wherein a surface of said supporting shaft is coated with a material having a small frictional resistance.

* * * * *